(12) United States Patent
Yamaoka et al.

(10) Patent No.: US 11,227,170 B2
(45) Date of Patent: Jan. 18, 2022

(54) COLLATION DEVICE AND COLLATION METHOD

(71) Applicant: PANASONIC INTELLECTUAL PROPERTY MANAGEMENT CO., LTD., Osaka (JP)

(72) Inventors: Megumi Yamaoka, Tokyo (JP); Takayuki Matsukawa, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 12 days.

(21) Appl. No.: 16/624,201

(22) PCT Filed: May 30, 2018

(86) PCT No.: PCT/JP2018/020687
§ 371 (c)(1),
(2) Date: Dec. 18, 2019

(87) PCT Pub. No.: WO2019/017080
PCT Pub. Date: Jan. 24, 2019

(65) Prior Publication Data
US 2020/0134343 A1    Apr. 30, 2020

(30) Foreign Application Priority Data
Jul. 20, 2017   (JP) .............................. JP2017-140718

(51) Int. Cl.
G06K 9/00     (2006.01)
G06T 5/40     (2006.01)
H04N 5/235    (2006.01)

(52) U.S. Cl.
CPC ..... *G06K 9/00899* (2013.01); *G06K 9/00281* (2013.01); *G06K 9/00288* (2013.01); *G06T 5/40* (2013.01); *H04N 5/2351* (2013.01)

(58) Field of Classification Search
CPC .. G06K 9/00208; G06K 9/00288; G06K 9/46; G06K 9/62; G06K 9/627;
(Continued)

(56) References Cited

U.S. PATENT DOCUMENTS 10,810,461 B2 * 10/2020 Sugiura ................. G06F 21/60
2002/0103574 A1 * 8/2002 Funada .............. H04N 5/23219
                                                                  700/245
(Continued)

FOREIGN PATENT DOCUMENTS

JP      11-339048       12/1999
JP      2004222118 A *  8/2004    ......... G06K 9/00234
(Continued)

OTHER PUBLICATIONS

Single-View Recaptured Image Detection Based On Physics-Based Features (Year: 2010).*
(Continued)

*Primary Examiner* — Nizar N Sivji
(74) *Attorney, Agent, or Firm* — Greenblum & Bernstein, P.L.C.

(57) ABSTRACT

A collation device is configured to include a processor, and a storage unit that stores a predetermined determination condition in advance, under which a photographic image which is an image obtained by imaging a photograph of the subject is capable of being eliminated, the processor is configured to detect brightness distribution of a face image obtained by imaging an authenticated person with an imaging unit, determine whether or not the detected brightness distribution satisfies a determination condition, and perform face authentication using the face image satisfying the determination condition.

7 Claims, 8 Drawing Sheets

(58) Field of Classification Search
CPC ............ G06K 9/6276; G06K 9/00899; G06K 9/00281; G06K 9/4661; G06K 9/00268; G06T 1/0021; G06T 7/50; G06T 7/579; G06T 5/40; G06T 7/00; H04N 13/271; H04N 5/2351; H04N 5/23219
See application file for complete search history.

(56) References Cited

U.S. PATENT DOCUMENTS

| | | | | |
|---|---|---|---|---|
| 2006/0056664 | A1* | 3/2006 | Iwasaki | G06K 9/00899 |
| | | | | 382/115 |
| 2011/0222743 | A1* | 9/2011 | Tanaka | G06K 9/00288 |
| | | | | 382/118 |
| 2012/0087552 | A1* | 4/2012 | Lee | G06K 9/00275 |
| | | | | 382/118 |
| 2020/0134343 | A1* | 4/2020 | Yamaoka | G06K 9/4661 |
| 2020/0265217 | A1* | 8/2020 | Kochi | G06K 9/00295 |

FOREIGN PATENT DOCUMENTS

| | | | | |
|---|---|---|---|---|
| JP | 2009-187130 | | 8/2009 | |
| JP | 2009187130 A | * | 8/2009 | |
| KR | 101700595 B1 | * | 1/2017 | ......... G06K 9/00214 |
| KR | 101870226 B1 | * | 6/2018 | ............. A61B 5/103 |

OTHER PUBLICATIONS

Face Liveness Detection using Variable Focusing (Year: 2013).*
International Search Report issued in International Pat. Appl. No. PCT/JP2018/020687, dated Aug. 28, 2018.

* cited by examiner

COLLATION DEVICE AND COLLATION METHOD

TECHNICAL FIELD

The present disclosure relates to a collation device and a collation method of collating a captured image obtained by imaging a subject with an imaging device with a registered image of a registered subject registered in advance.

BACKGROUND ART

In the related art, a face authentication technique for identifying an individual based on a face image is known. In such a face authentication technique, face authentication is performed by collating a face image obtained by imaging the face of the authenticated person with the imaging device with a face image of the authenticated person registered in advance. For example, in a mobile terminal such as a smartphone, in a case of performing face authentication for collating identification of a user of the terminal, the face authentication is performed by collating a face image obtained by imaging a face of an authenticated person with an imaging device (camera) mounted on the mobile terminal with a registered image (a face image of the authenticated person obtained by imaging in advance) registered in advance in an authentication server that can communicate with the mobile terminal or the terminal.

However, such a face authentication technique has a problem of "impersonation" that uses a face photograph to impersonate a person of the face photograph and fraudulently acquire authentication. For example, it is assumed that a person who obtains a mobile terminal and a user ID of the terminal tries to obtain authentication fraudulently by using a face image obtained by imaging a face photograph attached to the ID with an imaging device to impersonate a person in the face photograph. For this reason, it is required to identify whether a face image obtained by imaging with an imaging device is obtained by imaging a photograph or a person.

In this regard, a method of requesting a predetermined operation such as blinking or changing the orientation of a face to an authenticated person at the time of imaging, and checking an imaging subject is a person based on whether or not the requested operation is performed, and a method checking that an imaging subject is a person by changing lighting conditions and imaging a plurality of times, and comparing shadows generated in the face images obtained by every single image have been proposed (refer to PTL 1).

CITATION LIST

Patent Literature

PTL 1: Japanese Patent Unexamined Publication No. 11-339048

SUMMARY OF THE INVENTION

However, in the method disclosed in the above PTL 1, there is a problem in that it is necessary to request a predetermined operation for the authenticated person at the time of imaging, or to change the lighting conditions to image a plurality of times, and thereby convenience and simplicity of the face authentication work are impaired.

The present disclosure has been devised in view of such a problem of the technique in the related art, and a main object of the present disclosure is to provide a collation device and a collation method according to the present disclosure that can easily prevent fraud using a photograph in a technique for collating a captured image obtained by imaging a subject with an imaging device with a registered image of a registered subject registered in advance.

According to the present disclosure, there is provided a collation device that collates a captured image obtained by imaging a subject by using an imaging device with a registered image of a registered subject which is registered in advance, the device including a processor, and a storage unit that stores a predetermined determination condition in advance, under which a photographic image which is an image obtained by imaging a photograph of the subject is capable of being eliminated, in which the processor detects a brightness distribution of the captured image, determines whether or not the detected brightness distribution satisfies the determination condition, and collates whether or not the subject in the image matches the subject in the registered image by using the captured image satisfying the determination condition.

According to the present disclosure, it is possible to easily prevent fraud using a photograph in a collation technique for collating a captured image obtained by imaging a subject with an imaging device with a registered image of a registered subject registered in advance.

DESCRIPTION OF EMBODIMENTS

Figure 1:
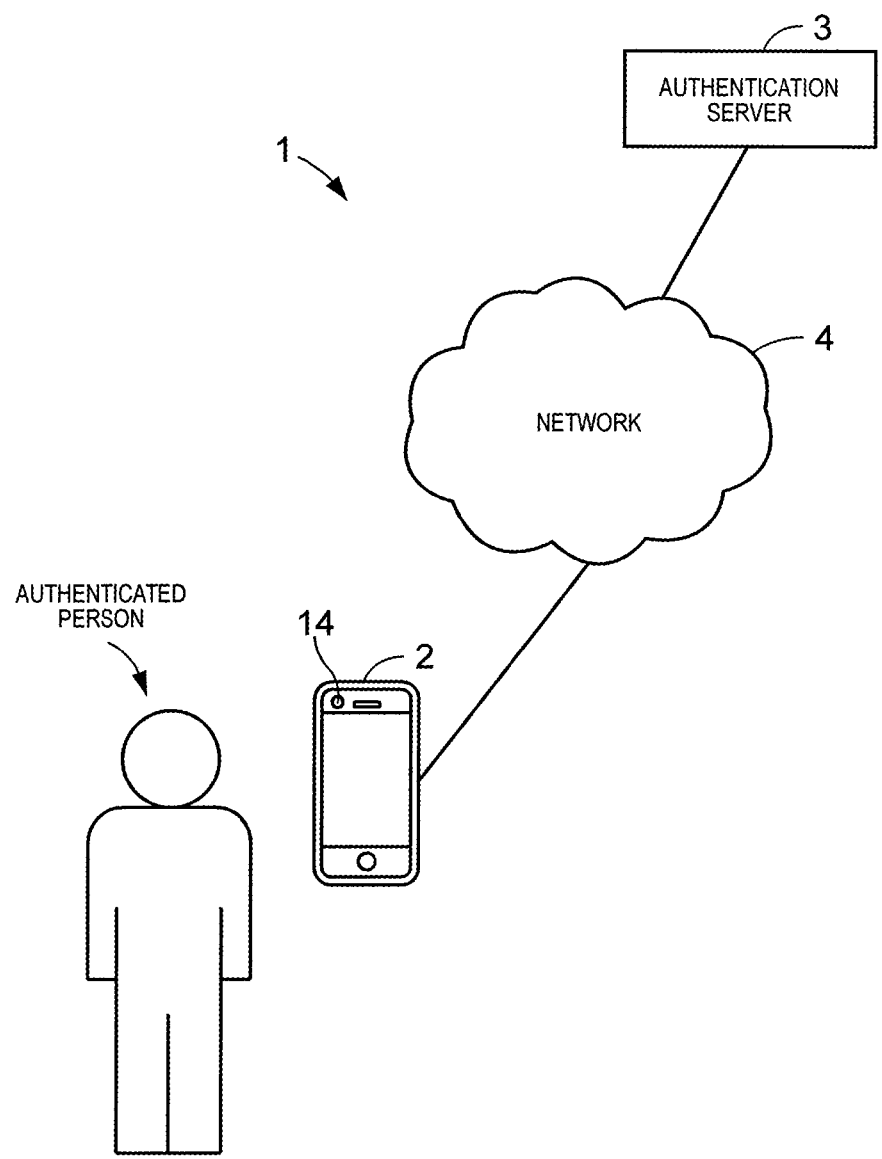
FIG. 1 is a schematic diagram of a collation system including a collation device according to the present disclosure.

A first disclosure made to solve the above problems relates to a collation device that collates a captured image obtained by imaging a subject by using an imaging device with a registered image of a registered subject which is registered in advance, the device including a processor, and a storage unit that stores a predetermined determination condition in advance, under which a photographic image which is an image obtained by imaging a photograph of the subject is capable of being eliminated, in which the processor detects a brightness distribution of the captured image, determines whether or not the detected brightness distribution satisfies the determination condition, and collates whether or not the subject in the captured image matches the registered subject in the registered image by using the captured image satisfying the determination condition.

According to the collation device of the first disclosure, when the collation is performed, a photographic image can be eliminated based on the brightness distribution of a captured image obtained by imaging the subject with the imaging device. This makes it possible to easily prevent fraud using photographs.

In a second disclosure according to the above first disclosure, the determination condition is a separation boundary capable of separating a real image that is an image obtained by imaging a real subject and the photographic image based on at least one of whether or not the captured image includes brightness that exceeds a predetermined upper limit boundary, and whether or not the captured image includes brightness that falls below a predetermined lower limit boundary.

According to the collation device of the second disclosure, it is possible to distinguish between the real image and the photographic image based on at least one of high brightness and low brightness. Therefore, it is possible to relatively easily distinguish between the real image and the photographic image without performing a complicated image process.

In a third disclosure according to the above second disclosure, the separation boundary is a boundary capable of separating a real image that is an image obtained by imaging a real subject and the photographic image based on at least one of a maximum value and a minimum value of the brightness of the captured image, and the processor detects at least one of the maximum value and the minimum value of the brightness of the captured image, and collates at least one of the detected maximum value or minimum value of the brightness with the separation boundary to determine whether the captured image is the real image or the photographic image.

According to the collation device of the third disclosure, when the collation is performed based on the captured image, it is possible to distinguish between the real image and the photographic image using a classification boundary obtained in advance. With this, the photographic image is easily removed.

In a fourth disclosure according to the third disclosure, the separation boundary is obtained by classifying a data group of at least one of the maximum value and the minimum value of the brightness of the photographic image and the real image into two classes using a two-class classifier.

According to the collation device of the fourth disclosure, an appropriate separation boundary can be easily obtained.

In a fifth disclosure according to the first disclosure, the determination condition is a shape of a determination light beam irradiated to the subject when the captured image is acquired, and the processor detects, from the captured image acquired by imaging the subject irradiated with the determination light beam, a highlight that is an area in which the brightness in the captured image exceeds a predetermined reference value, and determines that the captured image is the photographic image in a case where the highlight is detected and the shape of the detected highlight corresponds to the shape of the determination light beam.

According to the collation device of the fifth disclosure, when performing the collation based on the captured image, the real image and the photographic image can be distinguished from each other based on presence or absence or the shape of the highlight formed on the captured image. With this, the photographic image is easily removed.

In a sixth disclosure according the fifth disclosure, the determination light beam is a light beam having a horizontally long linear shape with a predetermined width.

According to the collation device of the sixth disclosure, it is possible to easily determine whether or not the shape of the highlight formed on the captured image corresponds to the shape of the determination light beam.

In a seventh disclosure according to the fifth disclosure or the sixth disclosure, the processor determines that the captured image is the real image in a case where an area of the detected highlight is smaller than a predetermined area.

According to the collation device of the seventh disclosure, it is possible to distinguish between the real image and the photographic image based on the area of the detected highlight. With this, the photographic image is easily removed.

Further, in an eighth disclosure according to any one of the first disclosure to the seventh disclosure, the subject is a person's face.

According to the collation device of the eighth present disclosure, it is possible to collate a person's face. Therefore, it is possible to prevent impersonation using a face photograph attached to an identification card or the like.

A ninth disclosure is a collation method of collating a captured image obtained by imaging a subject by using an imaging device with a registered image of a registered subject which is registered in advance, the method including a step of storing a predetermined determination condition in advance, under which a photographic image which is an image obtained by imaging a photograph of the subject is capable of being eliminated, a step of detecting a brightness distribution of the captured image, a step of determining whether or not the detected brightness distribution satisfies the determination condition, and a step of collating whether or not the subject in the captured image matches the registered subject in the registered image by using the captured image satisfying the determination condition.

According to the collation method according to the ninth disclosure, when the collation is performed, a photographic image can be eliminated based on the brightness distribution of a captured image obtained by imaging the subject with the imaging device. This makes it possible to easily prevent fraud using photographs.

Hereinafter, embodiments of the present disclosure will be described with reference to the drawings. A situation, in which face authentication is performed by collating a face image obtained by imaging a face of the authenticated person with a registered image registered in advance (face of the authenticated person image obtained by imaging in advance), is explained in the following embodiments.

First Embodiment

FIG. 1 is a schematic diagram of collation system 1 including a collation device according to the present disclosure. As illustrated in FIG. 1, collation system 1 includes mobile terminal 2 possessed by an authenticated person who needs face authentication, and authentication server 3 that performs face authentication in cooperation with mobile terminal 2. Mobile terminal 2 corresponds to the collation device according to the present disclosure. Mobile terminal 2 and authentication server 3 are connected to each other via network 4 such as the Internet or a dedicated line.

Mobile terminal 2 is, for example, a smartphone or a tablet terminal, and includes imaging unit 14 for imaging the face of the authenticated person. Mobile terminal 2 is installed with an authentication request application program for requesting face authentication based on a face image obtained by imaging with imaging unit 14 (hereinafter, referred to as "captured image"). When performing the face authentication, the authentication request application program is activated, and the authenticated person performs an operation for requesting face authentication, and when the face of the authenticated person is imaged by imaging unit 14, an authentication request and a captured image are transmitted to authentication server 3 from mobile terminal 2, and a process related to the face authentication is executed in authentication server 3.

Authentication server 3 is a general computer device, and stores the face image (hereinafter, referred to as "registered image") of the authenticated person obtained by imaging in advance. When authentication server 3 receives the authentication request and the captured image from mobile terminal 2, authentication server 3 performs the face authentication by collating the received captured image with a registered image. This collation may be performed using a known collation method in the related art based on feature points such as each part of the face (for example, eyes, nose, and mouth) and contour. In addition, the collation result (that is, authentication result) is transmitted to mobile terminal 2, and the face authentication based on a captured image is completed by this.

Figure 2:
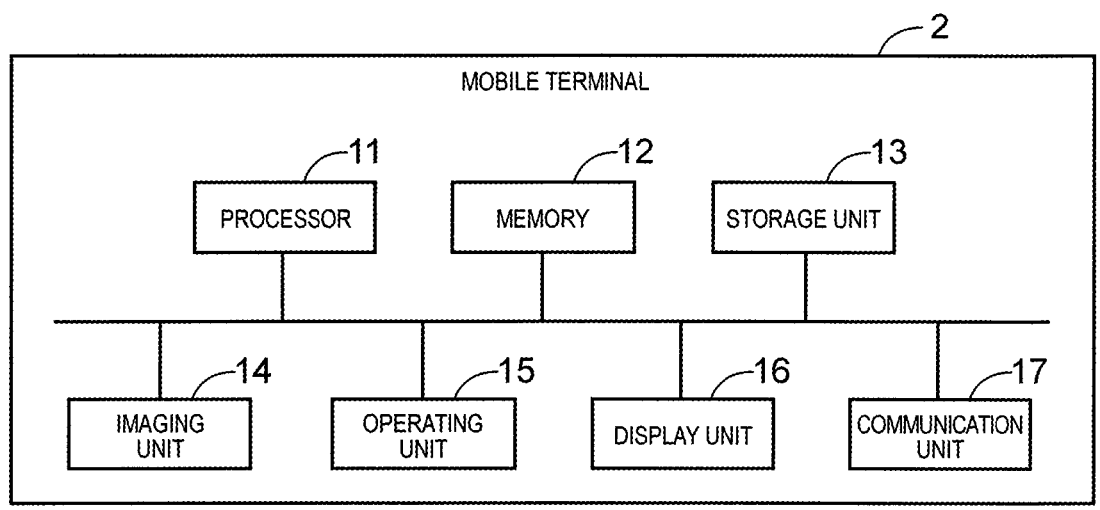
FIG. 2 is a block diagram illustrating a schematic configuration of a mobile terminal.

FIG. 2 is a block diagram illustrating a schematic configuration of mobile terminal 2. Mobile terminal 2 has a known hardware configuration, and includes processor 11 that centrally executes each process (for example, an authentication request process) of mobile terminal 2 based on a predetermined control program (for example, an authentication request program), memory 12 that is, for example, a random access memory (RAM) and functions as a work area of processor 11, and storage unit 13 that is, for example, a storage (storage device) such as a read only memory (ROM) or a hard disk, and stores a control program executed by processor 11, an impersonation determination database (DB), and the like. In the impersonation determination DB, a separation boundary described later is stored.

Mobile terminal 2 further includes imaging unit 14 that images a face of the authenticated person and generates a face image (captured image), operating unit 15 in which an operation for obtaining face authentication and an operation for causing imaging unit 14 to perform imaging are performed by the authenticated person, display unit 16 for displaying a captured image, a screen of an authentication result, and the like, and communication unit 17 that further executes communication via network 4. Imaging unit 14 is a solid-state imaging device such as a CMOS image sensor, and has a fixed focal distance.

Figure 3:
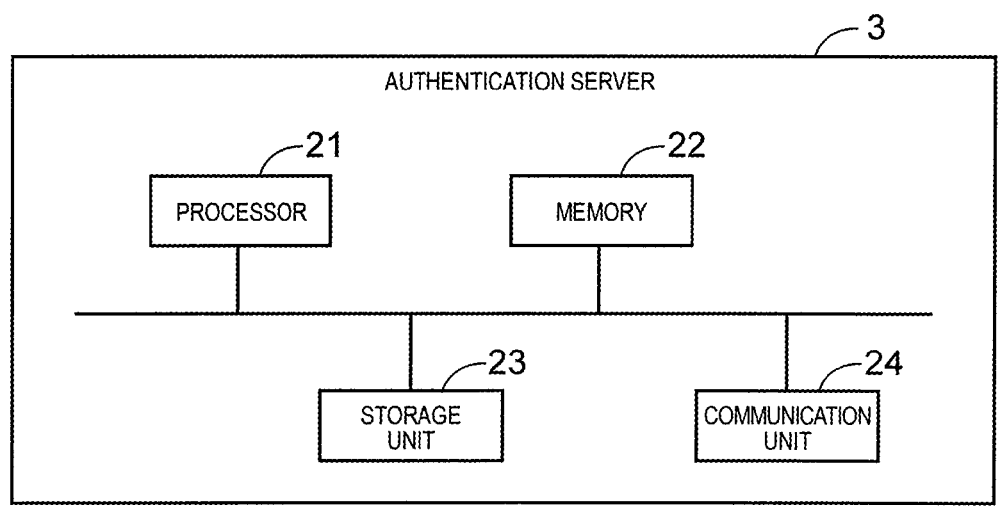
FIG. 3 is a block diagram illustrating a schematic configuration of an authentication server.

FIG. 3 is a block diagram illustrating a schematic configuration of authentication server 3. Authentication server 3 has a known hardware configuration, and includes processor 21 that centrally executes each process (for example, a face authentication process) of authentication server 3 based on a predetermined control program (for example, face authentication program), memory 22 that is, for example, a RAM and functions as a work area of processor 21, and storage unit 23 that is, for example, a storage such as a ROM or a hard disk, and stores a control program executed by processor 21, a registered image used for face authentication, and the like, communication unit 24 that performs communication via network 4.

Next, the separation boundary stored in the impersonation determination DB and a method for obtaining the separation boundary will be described. Hereinafter, an image obtained by imaging a face photograph (printed face photograph) of the authenticated person is referred to as a "photographic image", and an image obtained by imaging the real face of the authenticated person is referred to as a "real image". In the present embodiment, a photograph of a driver's license is used as the face photograph of the authenticated person. The face photograph of the authenticated person is not limited to a photograph of a driver's license, but can be a face photograph attached to a passport, a basic resident registration card, a student card, and other various identification cards.

Figure 4A:
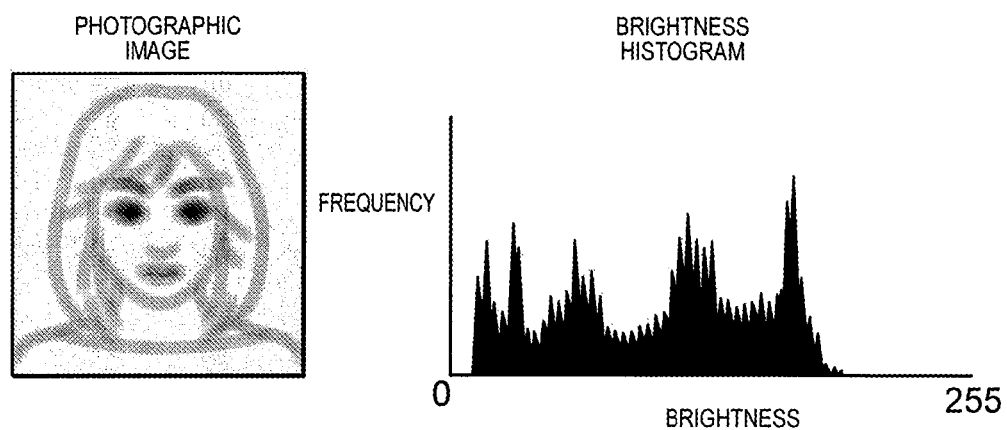
FIG. 4A is a diagram illustrating a photographic image and a brightness histogram of a face area.
Figure 4B:
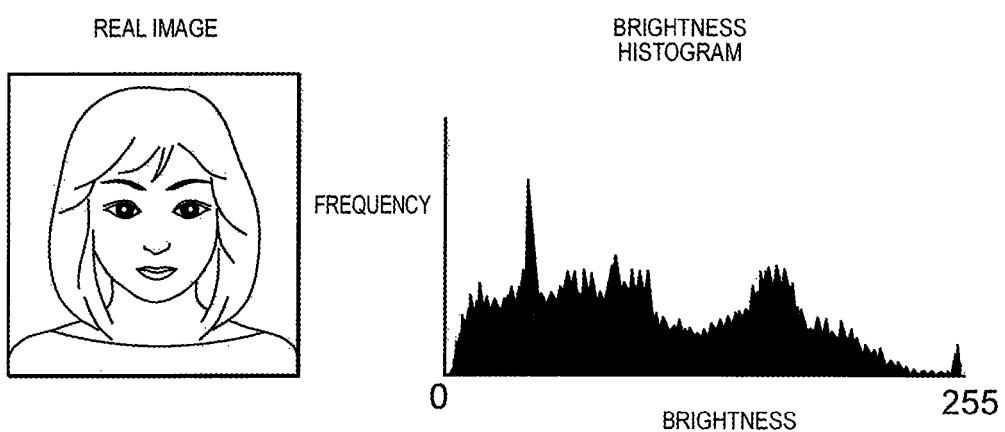
FIG. 4B is a diagram illustrating a real image and the brightness histogram of the face area.

FIG. 4A is a diagram illustrating a photographic image and a brightness histogram of a face area. FIG. 4B is a diagram illustrating a real image and the brightness histogram of the face area. The brightness histogram is obtained by counting the number of pixels (frequency) for each brightness regarding all the pixels in the face area. As can be seen from the brightness histograms of FIGS. 4A and 4B, in the real image, the brightness is widely distributed from 0 to 255, but in the photographic image, the brightness is not distributed from 0 and 255. That is, the photographic image has a narrower brightness distribution range than the real image.

This is considered to be due to the reflection properties of the face photograph. Since the face photograph is planar, the light incident on the face photograph is uniformly reflected. For this reason, in the photographic image, the range of the brightness distribution becomes narrower. On the other hand, the real face has a three-dimensional shape, and has irregularities in, for example, a nose, so that light incident on the real face is reflected in various ways. For this reason, the range of the brightness distribution is widened in the real image.

Figure 5:
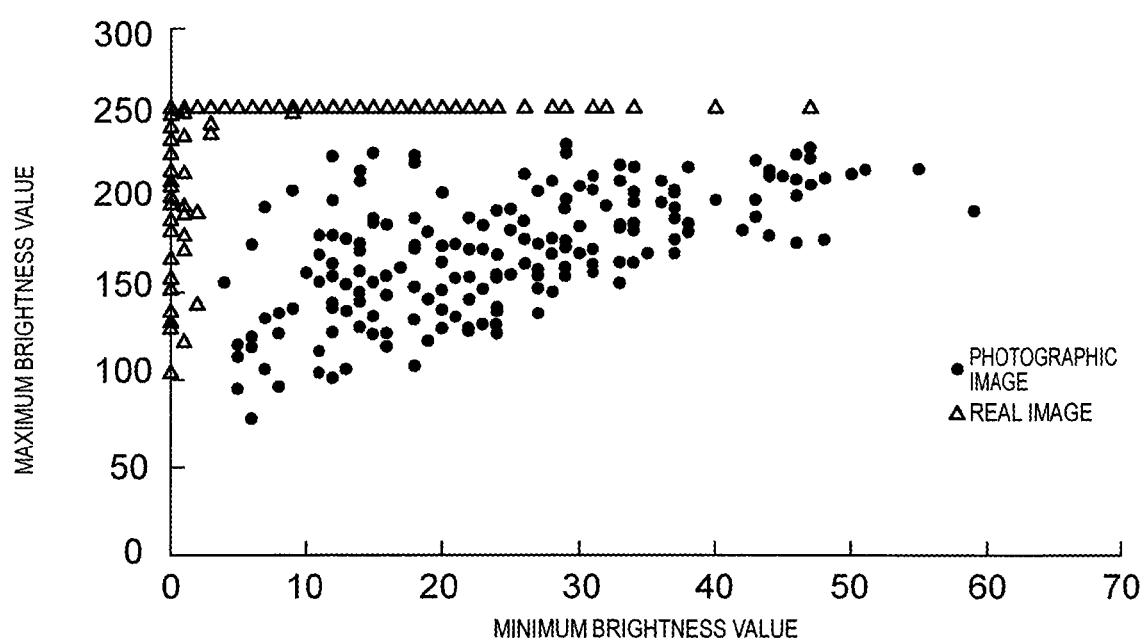
FIG. 5 is a graph in which a maximum brightness value and a minimum brightness value of each face area of a plurality of photographic images and real images are plotted.

FIG. 5 is a graph in which combinations of a maximum brightness value and a minimum brightness value of each face area of a plurality of photographic images and real images are plotted. A horizontal axis of the graph indicates the minimum brightness value, and a vertical axis indicates the maximum brightness value. As described above, since the real image has a wide distribution of the brightness from 0 to 255, the number of plot points having the minimum brightness value of 0 or the maximum brightness value of 255 is increased. On the other hand, since the range of the brightness distribution of the photographic image is narrower than that of the real image, the plot points are distributed in a range where the minimum brightness value is larger than 0 and the maximum brightness value is smaller than 255.

Therefore, if the separation boundary that is capable of separating the real image and the photographic image is obtained in advance by trial and error or experimentation, it is possible to distinguish between the real image and the photographic image, when performing the face authentication, based on the separation boundary obtained in advance. The obtained separation boundary is stored in the impersonation determination DB.

Figure 6:
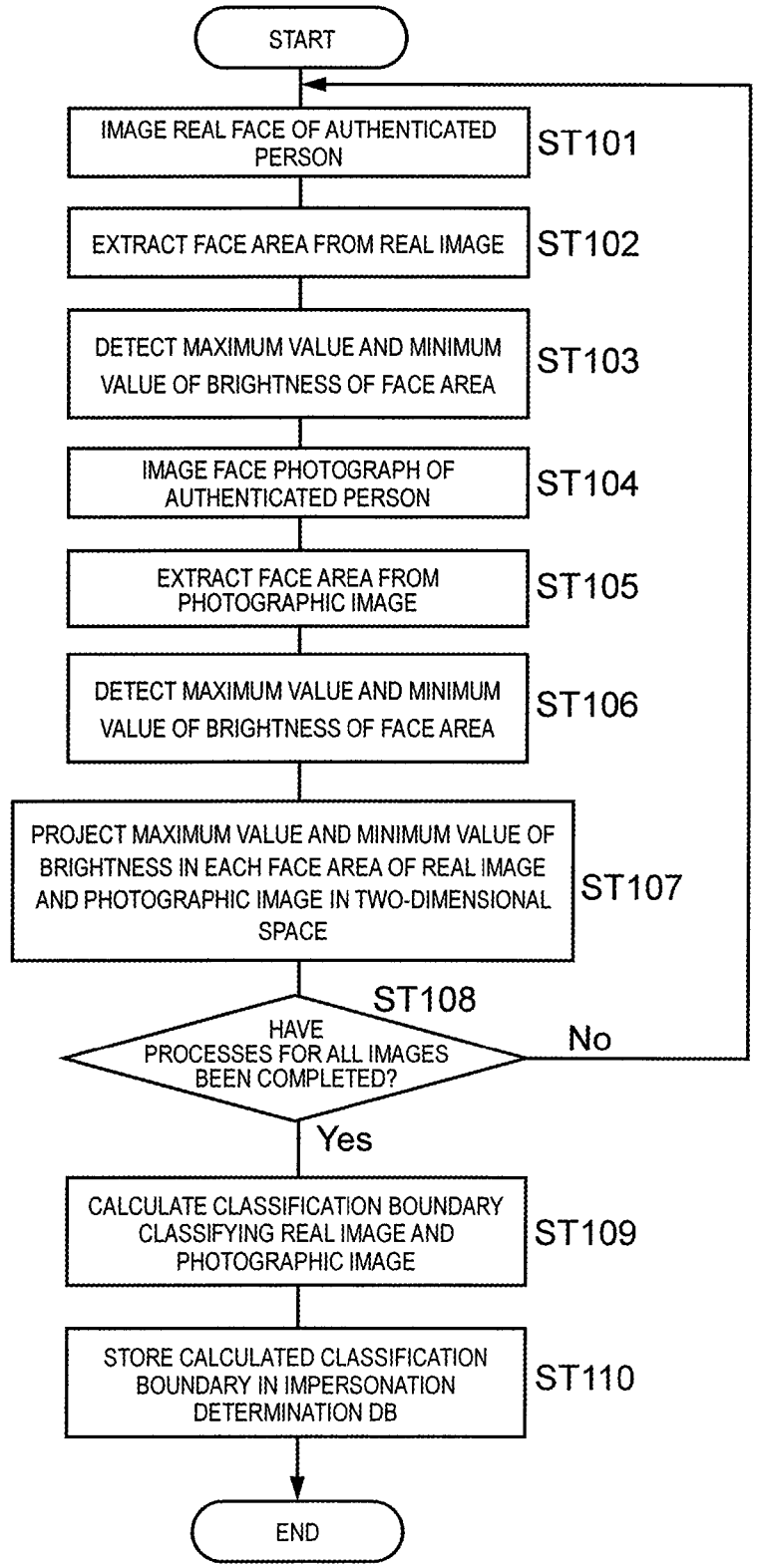
FIG. 6 is a flowchart for illustrating a method of obtaining a separation boundary.

Next, a method of obtaining the above-described separation boundary will be described with reference to the flowchart of FIG. 6. The following process may be performed by mobile terminal 2 or may be performed by another terminal device that can communicate with authentication server 3.

When using other terminal devices, it is preferable to use an imaging device having the same imaging capability as that of imaging unit 14 of mobile terminal 2 so as to make the same imaging conditions as those during the real face authentication.

First, a real face of the authenticated person is imaged (step ST101). Subsequently, the face area is extracted from the real image obtained by imaging the real face of the authenticated person (step ST102). The extraction of the face area may be performed using a known face area extraction method in the related art based on feature points such as each part of the face (for example, eyes, nose, and mouth) and contour. The maximum value and the minimum value of the brightness of the face area of the real image are detected (step ST103).

Next, a face photograph of the authenticated person is imaged (step ST104). Subsequently, the face area is extracted from the photographic image obtained by imaging the face photograph of the authenticated person (step ST105). As the face photograph of the authenticated person, for example, a photograph of a driver's license of the authenticated person prepared in advance may be used. Similar to the case of extracting the face area from the real image, the detection of the face area may be performed using a known face area extraction method in the related art based on feature points such as each part of the face (for example, eyes, nose, and mouth) and contour. The maximum value and the minimum value of the brightness of the face area of the photographic image are detected (step ST106). The order of steps ST101 to 103 and steps ST104 to 106 may be reversed.

Next, the combination of the maximum brightness value and the minimum brightness value in each face area of the real image and the photographic image is projected (plotted) in a two-dimensional space (step ST107). Specifically, as described above with reference to FIG. 5, the combination of the maximum brightness value and the minimum brightness value in each face area is plotted on a graph in which the horizontal axis indicates the minimum brightness value and the vertical axis indicates the maximum brightness value. As described above, since the real image has a wide distribution of the brightness from 0 to 255, the number of plot points having the minimum brightness value of 0 or the maximum brightness value of 255 is increased. On the other hand, since the range of the brightness distribution of the photographic image is narrower than that of the real image, the plot points having the minimum brightness value larger than 0 and the maximum brightness value smaller than 255 are increased. The accuracy of the separation boundary improves as the number of combinations of the maximum brightness value and the minimum brightness value registered in the impersonation determination DB is increased. For this reason, the processes of steps ST101 to ST107 described above are performed for each of a plurality of real images and photographic images. Therefore, in step ST108 following step ST107, it is determined that whether or not the processes of step ST101 to ST107, that is, whether or not the maximum value and the minimum value of the brightness of the face area are detected, are completed for all of the plurality of real images and photographic images. In a case where it is determined that all the images have been processed (step ST108: Yes), the process proceeds to step ST109, and if it is determined that the process has not been completed (step ST108: No), the process returns to step ST101.

The classification boundary capable of classifying the real image and the photographic image in the two-dimensional space is calculated (step ST109). Specifically, by using a two-class classifier such as SVM (Support Vector Machine), an optimum separation boundary that is capable of classifying the real image and the photographic image into two classes of a plot point (data group) of the photographed image and a plot point (data group) of the photographic image is obtained. The obtained classification boundary is stored in the impersonation determination DB (step ST110).

In this way, it is possible to obtain the optimum separation boundary that can separate the real image and the photographic image.

The separation boundary is obtained as a combination of the maximum brightness value and the minimum brightness value. Hereinafter, the maximum brightness value and the minimum brightness value obtained as the separation boundary are referred to as "boundary maximum value" and "boundary minimum value", respectively.

Therefore, when performing the face authentication based on the face image, in a case where the maximum value of the brightness in the face area of the face image is equal to or larger than the maximum boundary value and the minimum value of the brightness in the face area of the face image is equal to or smaller than the minimum boundary value, it can be determined as a real image. Alternatively, in a case where the maximum value of the brightness in the face area of the face image is smaller than the maximum boundary value and the minimum value of the brightness in the face area of the face image larger than the minimum boundary value, it can be determined as a photographic image.

The separation boundary may be only one of the maximum boundary value and the minimum boundary value.

In a case where only the boundary maximum value is used, if the maximum value of the brightness in the face area of the face image is equal to or larger than the boundary maximum value, it can be determined as a real image. Alternatively, in a case where the maximum value of the brightness in the face area of the face image falls below the maximum boundary value, it can be determined as a photographic image.

In a case where only the boundary minimum value is used, if the minimum value of the brightness in the face area of the face image is equal to or smaller than the boundary minimum value, it can be determined as a real image. Alternatively, in a case where the minimum value of the brightness in the face area of the face image exceeds the minimum boundary value, it can be determined as a photographic image.

The separation boundary is not particularly limited as long as the real image and the photographic image can be separated, and may be various separation boundaries including a non-linear separation boundary. The method of obtaining the separation boundary is not particularly limited, and for example, the separation boundary can be obtained by using various types of classifiers such as a neural network.

Figure 7:
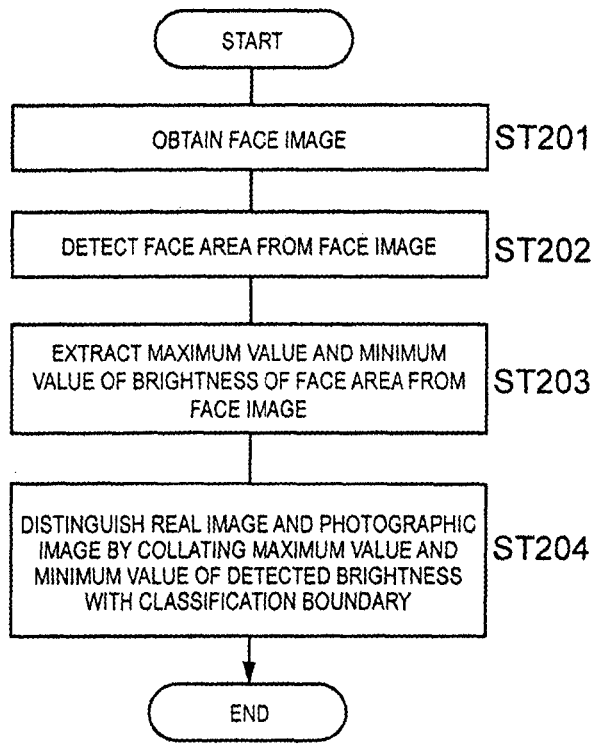
FIG. 7 is a flowchart for illustrating a series of processes in a collation device according to a first embodiment of the present disclosure.

Next, a series of processes in collation device (mobile terminal) 2 according to the first embodiment of the present disclosure will be described with reference to the flowchart of FIG. 7.

First, a real face or a face photograph of the authenticated person is imaged by imaging unit 14 of mobile terminal 2 to obtain a face image (captured image) of the authenticated person (step ST201). Subsequently, a face area is detected from the acquired face image (step ST202). This may be performed using a known face area extraction method in the related art based on feature points such as each part of the face (for example, eyes, nose, and mouth) and contour. The maximum and minimum brightness values of the face area are extracted (step ST203).

Next, the real image and the photographic image are distinguished from each other by collating the maximum value and the minimum value of the brightness detected from the face area of the face image with the classification boundary stored in the impersonation determination DB (step ST204). As described above, the classification boundary can separate the real image from the photographic image.

As described above, according to collation device (mobile terminal) 2 of the first embodiment of the present disclosure, when performing the face authentication based on a face image, the real image and the photographic image can be distinguished from each other using the classification boundary obtained in advance. This makes it possible to easily prevent impersonation using a face photograph.

Second Embodiment

Next, a second embodiment of collation device (mobile terminal) 2 according to the present disclosure will be described. In the second embodiment, matters not specifically mentioned below are the same as those in the first embodiment.

The second embodiment is different from the first embodiment from the viewpoint of that a photographic image or a real image is determined not based on the maximum value and the minimum value of the brightness in the face area of the face image, but based on a saturation area (highlight) of the brightness in the face area of the face image.

When imaging the subject with imaging unit 14 of mobile terminal 2, if the subject is irradiated with the light beam (hereinafter, referred to as "determination light beam") having a predetermined shape, the subject reflects the determination light beam, and thereby a highlight which is a saturation area (area where the brightness reaches 255) of the brightness is formed on the image obtained by imaging the subject.

Figure 8:
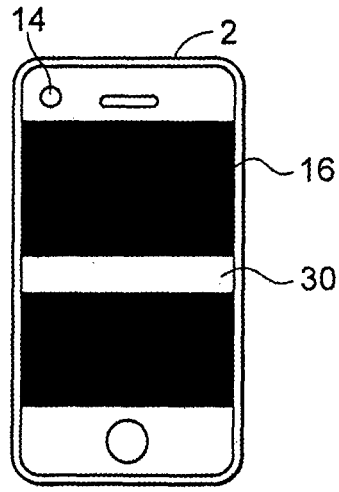
FIG. 8 is a diagram illustrating an example of an irradiation method of a determination light beam.

The irradiation of the determination light beam can be realized by displaying high-brightness white area 30 on display unit 16 of mobile terminal 2, for example, as illustrated in FIG. 8. In the present embodiment, high-brightness white area 30 having a horizontally long linear shape is displayed on display unit 16 of mobile terminal 2 to irradiate the determination light beam having a horizontally long linear shape.

The shape of the determination light beam is not limited to a horizontally long linear shape, and may be various shapes such as a vertically long linear shape, a lattice shape, and a concentric circular shape. The irradiation of the determination light beam is not limited to displaying a high-brightness white area on display unit 16 of mobile terminal 2, and may be performed from an illumination unit (light) mounted on mobile terminal 2, for example. In this case, the shape of the determination light beam may be set by covering the light irradiation surface of the illumination unit with a filter having a predetermined shape.

Figure 9A:
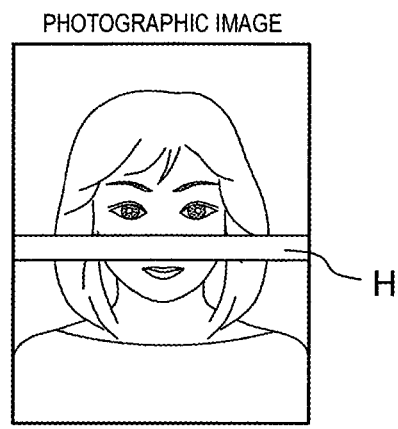
FIG. 9A is a diagram illustrating highlight formed on a photographic image.

In the case of the photographic image in which the subject is the face photograph, as illustrated in FIG. 9A, the highlight having substantially the same shape as the shape of the determination light beam is formed. In the present embodiment, since the determination light beam having the horizontally long linear shape is irradiated, highlight H having the horizontally long linear shape is formed on the photographic image. Since imaging unit 14 (camera) of mobile terminal 2 has a fixed focal distance, when imaging a face photograph with imaging unit 14, imaging unit 14 is imaged close to the face photograph. Therefore, since the face photograph is irradiated with the determination light beam at a close distance, highlight H is clearly formed on the photographic image.

Figure 9B:
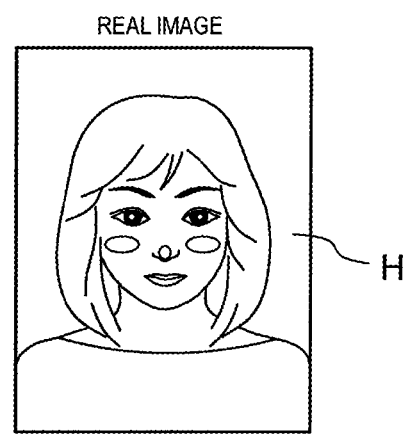
FIG. 9B is a diagram illustrating highlight formed on a real image.

On the other hand, in the case of the real image where the subject is a real face, as illustrated in FIG. 9B, the shape of highlight H formed in the face area is distorted due to the three-dimensional shape of the face. Highlight H is generated in a portion where reflection of the light is strong as viewed from imaging unit 14. The intensity of the reflected light imaged by imaging unit 14 is determined by a position of a light source, a normal of a surface on which the light is projected, and a position of imaging unit 14. Generally, in a case where the light source and imaging unit 14 are located at substantially the same position, in other words, in a case where a projection direction of the light and an imaging axis of imaging unit 14 substantially match with each other, the more the light projection direction matches the normal of the surface on which the light is projected, the stronger the reflected light imaged by imaging unit 14. Therefore, in the real image, highlight H is likely to appear at a portion where the angle between the normal of the face surface and the imaging axis of imaging unit 14 is small (for example, an apex of a nose or a cheek in a case where a person is facing imaging unit 14), highlight H is unlikely to appear in other portions. In this way, in the real image, the shape of highlight H does not match the shape of the determination light beam. Also, when imaging the real face, the real face is imaged at a certain distance from imaging unit 14, and therefore, there is a case where the highlight is not formed in the real image. The above description is based on the premise that the light source for determination light beam and imaging unit 14 are located at substantially the same position; however, in a case where the light source of the determination light beam and imaging unit 14 are located at a distance from each other, highlight H does not always occur at the above-described portion (for example, a portion such as an apex of a nose or a cheek). Even in a case where highlight H is generated in the above-described portion or other portions, the shape of highlight H is affected by the three-dimensional shape of the face surface, and thus does not match the shape of the determination light beam.

Therefore, when imaging unit 14 of mobile terminal 2 images the face (real face or face photograph) of the authenticated person to acquire the face image of the authenticated person, if the face of the authenticated person is irradiated with the determination light beam, based on the presence or absence of the highlight formed in the face area of the face image acquired by imaging, or whether or not the shape of the highlight matches the shape of the determination light beam, it is possible to distinguish between the real image and the photographic image. The shape of the determination light beam is stored in advance in storage unit 13 of mobile terminal 2.

As a determination light beam, when irradiated with a horizontally long linear light beam having a predetermined width, it is possible to easily determine whether or not the shape of the highlight formed on the face image matches the shape of the determination light beam. The reason for this is that the distortion having the shape of highlight H in the vertical direction as illustrated in FIG. 9B is easier to detect than the distortion having other shapes in other directions.

Figure 10:
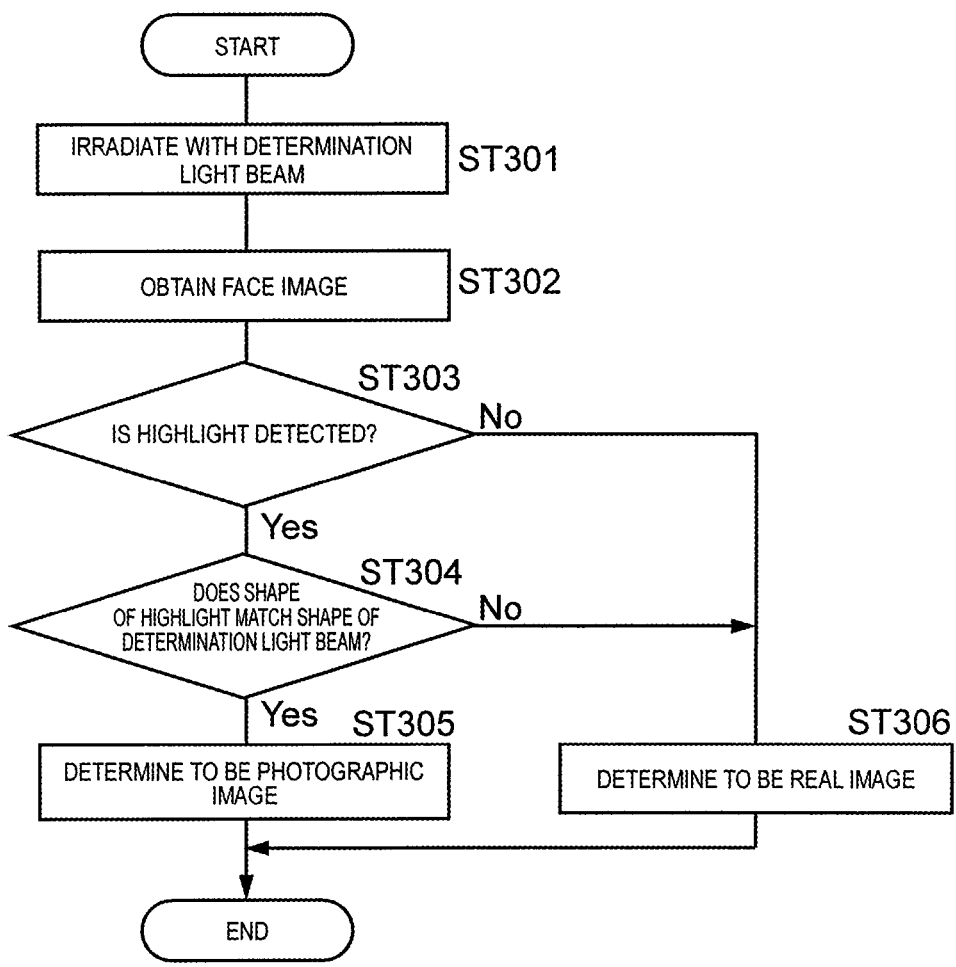
FIG. 10 is a flowchart for illustrating a series of processes in a collation device according to a second embodiment of the present disclosure.

Next, a series of processes in collation device (mobile terminal) 2 according to the second embodiment of the present disclosure will be described with reference to the flowchart of FIG. 10.

First, by displaying high brightness white area 30 on display unit 16 of mobile terminal 2, the face of the authenticated person (actual face or face photograph) is irradiated with the determination light beam (step ST301). Subsequently, the face of the authenticated person is imaged by imaging unit 14 of mobile terminal 2 to obtain a face image (captured image) of the authenticated person (step ST302).

Next, it is determined whether or not the highlights are detected from the face image (step ST303). Specifically, the saturation area of the brightness (area where the brightness reaches 255) on the face image is detected as a highlight. In a case where it is determined that the highlight has been detected (step ST303: Yes), the process proceeds to step ST304, and in a case where it is determined that the highlight has not been detected (step ST303: No), the process proceeds to step ST306.

In step ST304, it is determined whether or not the shape of the highlight detected in step ST303 matches the shape of the determination light beam. As described above, the shape of the determination light beam is stored in storage unit 13 of mobile terminal 2. In a case where it is determined that it matches the shape of the determination light beam (step ST304: Yes), the process proceeds to step ST305, and in a case where it is determined that it does not match the shape of the determination light beam (step ST304: No), the process proceeds to step ST306.

In step ST305, the face image is determined to be the photographic image, and in step ST306, the face image is determined to be the real image.

As described above, according to collation device (mobile terminal) 2 according to the second embodiment of the present disclosure, when performing the face authentication based on a face image, the real image and the photographic image can be distinguished from each other based on the presence and absence or the shape of the highlight formed on the face image. This makes it possible to easily prevent impersonation using a face photograph.

As described above, although the present disclosure was described based on specific embodiments, these embodiments are merely examples, and the present disclosure is not limited by these embodiments. All of the components of the collation device and the collation method according to the present disclosure described in the above embodiments are not necessarily essential, and can be appropriately selected as long as it does not depart from the scope of the present disclosure.

For example, in the present embodiment, collation system 1 is configured to include mobile terminal 2 and authentication server 3, but the function of authentication server 3 may be incorporated in mobile terminal 2. In this case, collation system 1 is configured to only include mobile terminal 2.

In the present embodiment, face authentication in mobile terminal 2 has been described; however, collation system 1 according to the present disclosure can be applied to various uses such as face authentication in a non-mobile terminal such as a desktop personal computer, and face authentication in a security system that unlocks an electric key or an automatic door at an entrance and exit gate.

In the present embodiment, the saturation area of the brightness is highlighted, but the present disclosure is not limited to this. Even if it is not saturated, an area where the brightness is higher than a predetermined reference value may be used as the highlight. The brightness is easily saturated in a case where the photograph is developed on glossy photographic paper or the like, but the brightness is less likely to be saturated in a case where the photograph is printed on drawing paper or the like. For this reason, in a case where it is desired to eliminate a photograph printed on the paper having the brightness less likely to be saturated, the highlight may be set as an area where the brightness is higher than a predetermined reference value.

In the present embodiment, it is determined whether or not the face image is a photographic image based on whether or not the shape of the highlight matches the shape of the determination light beam; however, the present disclosure is not limited to this. For example, if the photograph is tilted or bent and is exposed to the determination light beam, the shape of the highlight is slightly distorted. For example, if a perfectly circular determination light beam is applied to a tilted photograph, an elliptical highlight appears instead of a perfectly circular highlight. Therefore, if the match between the shape of the highlight and the shape of the determination light beam is not strictly determined, and a certain degree of correspondence is seen, it may be determined as a photographic image. As examples of correspondences, various things are conceivable such as evaluating whether the number of corners matches between the determination light beam and the highlight, and evaluating whether the shape of the highlight is a shape obtained by linearly transforming the shape of the determination light beam.

In the present embodiment, imaging unit 14 has been described as an example in which the focal distance is fixed, but is not limited thereto. Imaging unit 14 having a variable focal distance may be used. Here, as the distance between the subject and imaging unit 14 is increased, appropriate highlights may not appear, and thus in a case of using the highlight to distinguish between the real image and the photographic image, it is desirable to fix the focal distance to a short distance. In this case, since the user is forced to approach imaging unit 14 in order to focus the captured image, it can be expected that an appropriate highlight appears as a result.

In the present embodiment, it may be determined that the face image is the real image, in a case where the area of the highlight is smaller than a predetermined area (including a case where the highlight itself cannot be recognized). The reason for this is that in general, the light of a real image is more easily scattered than a photograph printed on glossy paper or the like, and the highlights are less likely to occur. Further, in a case where it is necessary to detect fraud strictly, if the area of the highlight is so small that the shape cannot be recognized, re-imaging may be requested. The reason for this is that it is easy to re-image an image in which a highlight occurs due to an action such as approaching imaging unit 14 if it is a real image.

In this embodiment, the configuration in which the authentication is performed by collating the face image has been described as an example, but the present disclosure is not limited to this. The authentication is merely one application of collation technology. For example, it is possible to consider performing the collation that does not assume authentication, such as a case of searching for a person with a specific feature, and the present embodiment can also be applied to such a case. Further, the target of collation is not limited to a person's face. The subject may be another subject that can perform a fraud act of being confused with an actual subject by using a photograph of the subject. For example, the present embodiment can be also applied to a case where a brand product or a noble metal is identified remotely.

INDUSTRIAL APPLICABILITY

A collation device and a collation method according to the present disclosure is useful as a collation device and a collation method that can easily prevent fraud using a photograph in a collation technique for collating a captured image obtained by imaging a subject with an imaging device with a registered image of a registered subject registered in advance.

REFERENCE MARKS IN THE DRAWINGS

1 COLLATION SYSTEM
2 MOBILE TERMINAL (COLLATION DEVICE)
3 AUTHENTICATION SERVER
4 NETWORK
11 PROCESSOR
12 MEMORY
13 STORAGE UNIT
14 IMAGING UNIT
15 OPERATING UNIT
16 DISPLAY UNIT
17 COMMUNICATION UNIT
30 HIGH BRIGHTNESS WHITE AREA
H HIGHLIGHT

The invention claimed is:

1. A collation device that collates a captured image obtained by imaging a person by using an imaging device with a registered image of a registered person which is registered in advance, the collation device comprising:
a processor; and
a storage unit that stores a predetermined determination condition in advance, under which a photographic image which is an image obtained by imaging a photograph of the person is capable of being eliminated,
wherein the processor
detects a brightness distribution of a face area in the captured image, the face area including at least a face of the person,
determines whether or not the detected brightness distribution of the face area satisfies the determination condition, and
collates whether or not the person in the captured image matches the registered person in the registered image by using the captured image satisfying the determination condition,
wherein the determination condition is a separation boundary capable of separating a real image that is an image obtained by imaging a real person and the photographic image based on at least one of whether or not the captured image includes brightness that exceeds a predetermined upper limit boundary, and whether or not the captured image includes brightness that falls below a predetermined lower limit boundary,
wherein the separation boundary is further based on at least one of a maximum value and a minimum value of the brightness of the captured image,
wherein the processor
detects at least one of the maximum value and the minimum value of the brightness of the captured image, and
collates at least one of the detected maximum value or minimum value of the brightness with the separation boundary to determine whether the captured image is the real image or the photographic image, and
wherein the separation boundary is obtained by classifying a data group of at least one of the maximum value and the minimum value of the brightness of the photographic image and the real image into two classes using a two-class classifier.

2. The collation device of claim 1,
wherein the face area additional includes a background along with the face of the person.

3. A collation device that collates a captured image obtained by imaging a person by using an imaging device with a registered image of a registered person which is registered in advance, the collation device comprising:
a processor; and
a storage unit that stores a predetermined determination condition in advance, under which a photographic image which is an image obtained by imaging a photograph of the person is capable of being eliminated,
wherein the processor
detects a brightness distribution of a face area in the captured image, the face area including at least a face of the person,
determines whether or not the detected brightness distribution of the face area satisfies the determination condition, and
collates whether or not the person in the captured image matches the registered person in the registered image by using the captured image satisfying the determination condition,
wherein the determination condition is a shape of a determination light beam irradiated to the person when the captured image is acquired, and
wherein the processor
detects, from the captured image acquired by imaging the person irradiated with the determination light beam, a highlight that is an area in which the brightness in the captured image exceeds a predetermined reference value, and
determines that the captured image is the photographic image in a case where the highlight is detected and the shape of the detected highlight corresponds to the shape of the determination light beam.

4. The collation device of claim 3,
wherein the determination light beam is a light beam having a horizontally long linear shape with a predetermined width.

5. The collation device of claim 3,
wherein the processor determines that the captured image is the real image in a case where an area of the detected highlight is smaller than a predetermined area.

6. A collation method of collating a captured image obtained by imaging a person by using an imaging device with a registered image of a registered person which is registered in advance, the collation method comprising:
storing a predetermined determination condition in advance, under which a photographic image which is an image obtained by imaging a photograph of the person is capable of being eliminated;
detecting a brightness distribution of a face area in the captured image, the face area including at least a face of the person;
determining whether or not the detected brightness distribution of the face area satisfies the determination condition; and collating whether or not the person in the captured image matches the registered person in the registered image by using the captured image satisfying the determination condition, wherein the determination condition is a separation boundary capable of separating a real image that is an image obtained by imaging a real person and the photographic image based on at least one of whether or not the captured image includes brightness that exceeds a predetermined upper limit boundary, and whether or not the captured image includes brightness that falls below a predetermined lower limit boundary, wherein the separation boundary is further based on at least one of a maximum value and a minimum value of the brightness of the captured image, wherein the collation method further comprises:
  detecting at least one of the maximum value and the minimum value of the brightness of the captured image, and
  collating at least one of the detected maximum value or minimum value of the brightness with the separation boundary to determine whether the captured image is the real image or the photographic image, and wherein the separation boundary is obtained by classifying a data group of at least one of the maximum value and the minimum value of the brightness of the photographic image and the real image into two classes using a two-class classifier.

7. A collation method of collating a captured image obtained by imaging a person by using an imaging device with a registered image of a registered person which is registered in advance, the collation method comprising:
  storing a predetermined determination condition in advance, under which a photographic image which is an image obtained by imaging a photograph of the person is capable of being eliminated;
  detecting a brightness distribution of a face area in the captured image, the face area including at least a face of the person;
  determining whether or not the detected brightness distribution of the face area satisfies the determination condition; and
  collating whether or not the person in the captured image matches the registered person in the registered image by using the captured image satisfying the determination condition, wherein the determination condition is a shape of a determination light beam irradiated to the person when the captured image is acquired, and wherein the collation method further comprises:
  detecting, from the captured image acquired by imaging the person irradiated with the determination light beam, a highlight that is an area in which the brightness in the captured image exceeds a predetermined reference value, and
  determining that the captured image is the photographic image in a case where the highlight is detected and the shape of the detected highlight corresponds to the shape of the determination light beam.

* * * * *